United States Patent [19]

Ausnit

[11] Patent Number: 4,601,694
[45] Date of Patent: Jul. 22, 1986

[54] THIN WALL RECLOSABLE BAG MATERIAL AND METHOD OF MAKING SAME

[75] Inventor: Steven Ausnit, New York, N.Y.

[73] Assignee: Minigrip, Inc., Orangeburg, N.Y.

[21] Appl. No.: 369,134

[22] Filed: Apr. 16, 1982

[51] Int. Cl.[4] .......... B31B 1/90; B32B 31/20; B65D 33/24

[52] U.S. Cl. .................. 493/381; 493/213; 493/214; 493/927; 428/349; 383/65; 156/308.2; 24/90 HA

[58] Field of Search .......... 493/214, 927, 962, 215, 493/211, 381, 213; 156/309.9, 308.6, 307.3; 24/304, 447, 90 HA; 383/63, 65; 428/35, 349

[56] References Cited

U.S. PATENT DOCUMENTS

| Re. 28,969 | 9/1976 | Naito | 150/3 |
|---|---|---|---|
| 2,780,261 | 2/1957 | Svec et al. | 150/3 |
| 3,054,434 | 9/1962 | Ausnit et al. | 150/3 |
| 3,338,284 | 8/1967 | Ausnit | 150/3 |
| 3,338,285 | 8/1967 | Jaster | 150/3 |
| 3,347,298 | 10/1967 | Ausnit et al. | 150/3 |
| 3,381,592 | 5/1968 | Ravel | 493/214 |
| 3,410,327 | 11/1968 | Ausnit | 150/3 |
| 3,416,199 | 12/1968 | Imamura | 24/201 |
| 3,532,571 | 10/1970 | Ausnit | 493/214 |
| 3,633,642 | 1/1972 | Siegel | 150/3 |
| 3,839,128 | 10/1974 | Arai | 156/583 |
| 3,846,209 | 11/1974 | Howard | 156/502 |
| 3,948,705 | 4/1976 | Ausnit | 156/73.4 |
| 3,986,914 | 10/1976 | Howard | 493/214 |
| 4,101,355 | 7/1978 | Ausnit | 156/66 |
| 4,191,230 | 3/1980 | Ausnit | 150/3 |
| 4,235,653 | 11/1980 | Ausnit | 156/91 |
| 4,279,677 | 7/1981 | Takahashi | 156/160 |
| 4,306,924 | 12/1981 | Kamp | 156/66 |
| 4,355,494 | 10/1982 | Tilman | 53/416 |
| 4,430,070 | 2/1984 | Ausnit | 493/215 |

FOREIGN PATENT DOCUMENTS 2037704 7/1980 United Kingdom .......... 383/65

Primary Examiner—Lowell A. Larson
Assistant Examiner—William E. Terrell
Attorney, Agent, or Firm—Hill, Van Santen, Steadman & Simpson

[57] ABSTRACT

Material for bags with flexible sidewalls having reclosable separable plastic profile bag mouth closures comprising flexible sheet material providing the bag body and sidewalls. The bag mouth closures comprise strips having separably interlockable complementary resilient plastic profiles and lateral pull flanges of greater thickness than the sheet material extending from one side of each of the base portions. The opposite side of each base portion is generally aligned with its profiles. The base portions and lateral pull flanges are secured in laminar relation to marginal portions of the sheet material, and with distal edges of the pull flanges directed toward bag top edges of the marginal sheet portions.

9 Claims, 7 Drawing Figures

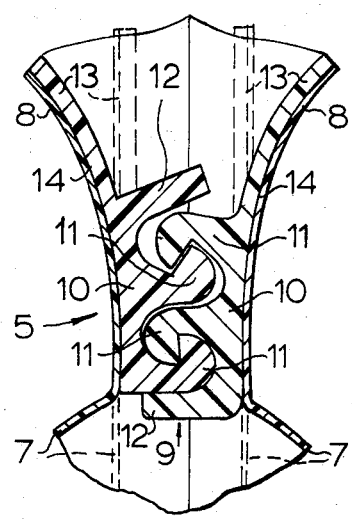
FIG.1
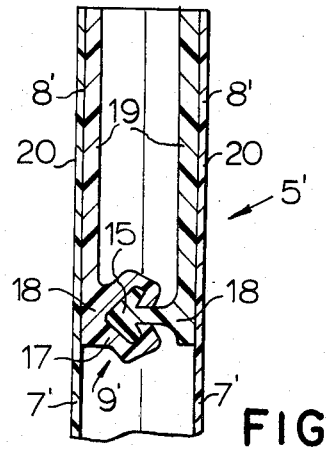
FIG.2
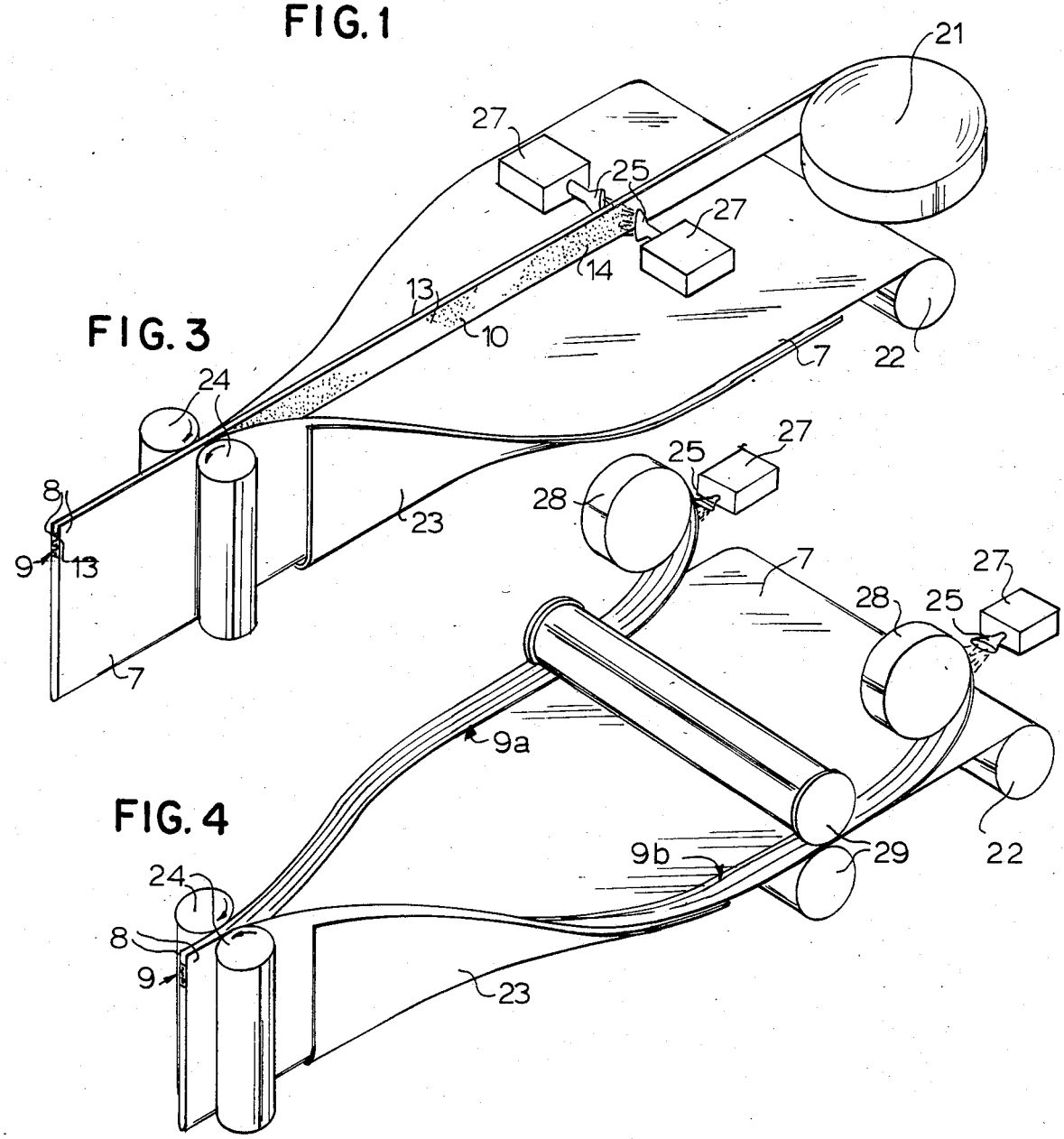
FIG.3
FIG.4

THIN WALL RECLOSABLE BAG MATERIAL AND METHOD OF MAKING SAME

This invention relates in general to the art of thin wall reclosable bags of the type having resiliently flexible plastic profile separable closure means along the top opening or mouth of the bag, and is more particularly concerned with a new and improved structure and assembly of the separable closure which will efficiently resist opening due to forces originating inside the bag especially when loaded with contents while opening of the bag is facilitated by opening force applied from outside of the bag.

Bags equipped with reclosable, extruded plastic profile fasteners have the great advantage of being easily closable by pressing the fasteners together, and easily openable by pulling the fasteners apart. As an aid for separating the fasteners, the bags may be equipped with pull flanges which project outwardly away from the fastener profiles and define a mouth extension for the bag mouth or opening.

A problem that has been long recognized in respect to bags having the resiliently flexible profile fasteners, sometimes referred to as zippers, is that if internal expansion pressure such as may be exerted on the bag walls by a load of contents, or entrapped air, is permitted to exert opening pull on the fastener profiles, the bags may be unintentionally opened. Numerous and sundry arrangements have been heretofore proposed with more or less success to alleviate this problem, as represented by U.S. Pat. No. Re. 28,969, in which the fastener profiles are shaped to attain the opening differential effect, that is hard opening from the inside and easy opening from the outside of the bag. U.S. Pat. Nos. 3,338,285, 3,347,298 and 3,410,327 disclose various means for attaining a differential opening force by the particular orientation of the profile mass. U.S. Pat. No. 3,416,199 provides a groove in the base of the female profile adjacent the outermost retaining flange to permit easy opening. In U.S. Pat. Nos. 2,780,261 and 3,054,434, a hinged mounting of the profile structure is provided for this purpose. In certain other U.S. patents, the bag material is provided with an arrangement in which the fastener profile structure is adapted to resist forces tending to open the bag from the inside, and pull flanges extending outwardly from the fastener profiles, facilitate applying digital leverage to separate the fastener for opening the bags. Representative are U.S. Pat. Nos. 3,338,284 and 3,633,642, which have the pull flange area of the sidewall thickened for improving the pull flange leverage. In these intergrally extruded arrangements, substantial manufacturing problems are encountered due to the greater mass of the material in the zipper portions and thickened flange areas of the sidewalls in relation to the thin section of the sidewall areas inwardly from the greater mass profile and thickened extension area. In the extrusion process, the material must cool and set from a fused, essentially fluid state and because of the mass differential and difference in cooling time, there is a high propensity for warpage requiring costly control expedients. There is also a tendency toward thinning or weakening of the material at the junction between the areas of mass differential.

Generally speaking, the greater mass portions of an integrally extruded plastic fastener and film bag sidewall structure limit the extrusion speed at which the product can be produced. On the other hand, plastic film or zipper profile alone can be extruded at a much greater production rate. Therefore, where the extrusion has a heavier mass portion, i.e., either or both of the fastener profiles and the thickened pull flange area, the production rate must be at the slower rate of the larger mass. The greater the difference between the film and the larger mass portions of the extrusion, the more the problem is accentuated. Also, the profiles or fasteners can be extruded in much larger multiples at one time than can the integral profile and film arrangement.

In another prior arrangement as disclosed in U.S. Pat. No. 4,191,230, a gusset carries the fastener profiles and pull flange extensions of the gusset are laminated to the margins of the bag body material. But the gusset material is necessarily of similar gauge material to that of the bag body material, and this limits pull flange leverage. The profile areas are not secured to the bag walls.

An important object of the present invention is to provide a new and improved thin wall reclosable bag material and method of making the same, wherein a laminated pull flange construction is attained in a new and improved manner and provides economical bags which will adequately resist opening of the fastener due to internal bag forces but will enable easy opening of the bag by digital manipulation of pull flanges.

To this end, the invention provides a new and improved method of making bag material for providing bags with flexible sidewalls and reclosable separable plastic profile bag mouth closure means, comprising advancing thin and flexible sidewall sheet material continuously along an assembly path; providing closure strips having base portions carrying separably interlockable complementary resilient plastic profiles that are generally aligned with said base portions, and the base portions provided with lateral pull flanges of greater thickness than said sheet material extending away from said profiles from one side of each of said base portions and with the opposite side of each base portion being generally aligned with its profile; continuously advancing said closure strips along said path and into laminar engagement with bag top mouth-opening-defining longitudinal marginal portions of said material; continuously joining said base portions and said lateral pull flanges in laminar relation assembly with said marginal portions and with the distal edges of said pull flanges directed toward the longitudinal edges of said marginal portions; and while said assembly continues advancing uninterruptedly permanently securing said pull flanges and said base portions in said assembly with said marginal portions.

This invention also affords new and improved material for bags with flexible sidewalls having reclosable separable plastic profile bag mouth closure means, comprising flexible bag sidewall sheet material having bag top mouth-opening-defining marginal portions; bag mouth closure means comprising strips having base portions carrying separably interlockable complementary resilient plastic profiles that are generally aligned with said base portions; lateral pull flanges, of greater thickness than said sheet material, extending away from one side of each of said base portions and with the opposite side of each base portion being generally aligned with its profile; and means for permanently securing said base portions and said pull flanges in laminar relation assembly with said marginal portions and with the distal edges of said pull flanges directed toward the bag-top edges of said marginal portions.

Other objects, features and advantages of the invention will be readily apparent from the following description of certain representative embodiments thereof, taken in conjunction with the accompanying sheet of drawings, although variations and modifications may be effected without departing from the spirit and scope of the novel concepts embodies in the disclosure and in which:

FIG. 1 is a fragmentary vertical sectional view showing the upper portion of a bag embodying the present invention;

FIG. 2 is a similar vertical sectional view showing a modification embodying the present invention;

FIG. 3 is a schematic view illustrating one embodiment of method of making the bag material according to the present invention;

FIG. 4 is a schematic view showing a modification of the method according to the present invention;

Figure 5:
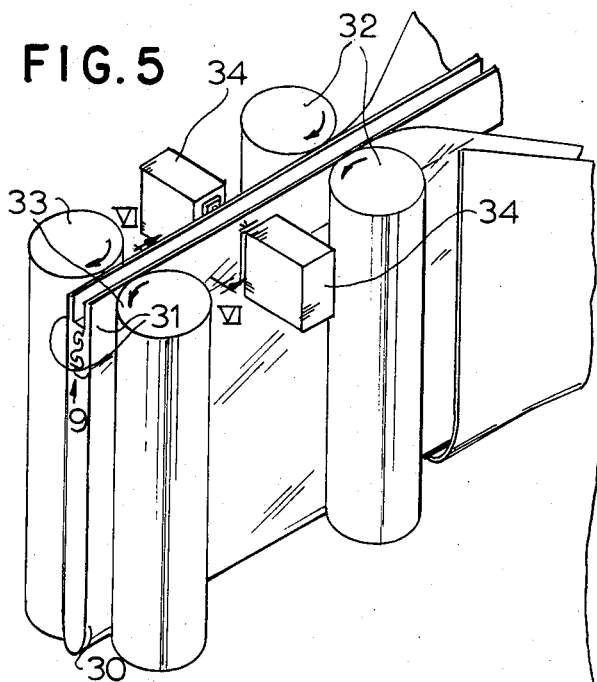
FIG. 5 is a fragmentary schematic perspective view illustrating another embodiment of the invention.

In one desirable embodiment of the present invention, as shown in FIG. 1, the material of a bag 5 comprises flexible sidewall sheet material 7 which provides both opposite sides of the bag and has bag top mouth-opening-defining marginal portions 8. The sidewall matetelial 7 is preferably extruded plastic film of less than 2 mils. Desirably the film material 7 is a bi-oriented plastic material suitable for the intended purpose. It may be monolayer or multilayer, all plastic extrusion or a laminate of different plastic films or a plastic film and a different material, such as paper or foil, or it may be a thin treated paper or foil.

Bag mouth closure means 9 comprises complementary strips each of which has a base portion 10 carrying separably interlockable complementary resilient profiles 11 which are preferably of the interlockable hook rib and intervening groove type. The separably interlocking profiles 11 are adapted to be interlocked by pressing them together and to be separated by pulling them apart, the resilient nature of the plastic material from which the profiles have been extruded resiliently yielding for this purpose. In this instance, the fastener 9 has, as a part of the profile structure, respective side retainer flanges 12 which cooperate with the hook rib profiles 11 to maintain them in the interlocked relation in the closed condition of the bag. Each of the fastener strips is constructed as a separately extruded strip formed independently of the other strip and formed independently of the sidewall sheet material 7.

An important aspect of the invention resides in the provision of respective lateral pull flange extensions 13 on the fastener strips, such pull flange extensions being of greater thickness than the sheet material 7 and extending from one side of each of the base portions 10. At the opposite side, each of the base portions 10 is substantially aligned with the profile structure carried thereon. For optimum results, the pull flange extensions 13 are of over 3 mil thickness, where the bag body material 7 is less than 2 mil. As assembled with the bag body, that is wall material 7, the pull flange extensions 13 are disposed in laminar relation to the marginal portions 8 and with the distal edges of the pull flange extensions 13 directed toward the top edges of the marginal portions 8. In an optimum arrangement, the distal edges of the pull flange extensions 13 and the top edges of the marginal portions 8 are aligned.

Any preferred technique may be employed in securing the fastener strips to the marginal portions of the bag body material 7 and in a preferred arrangement, the base of the fastener strip body 10 and the entire integral flange extensions 13 are secured permanently in laminar relation. Securing means 14 for this purpose may comprise a suitable adhesive providing a permanent bond between the marginal portions 8, the pull flange extensions 13 and the base portions 10 of the fastener strips. This provides a thorough and secure attachment of the parts of the assembly over large interface areas thereof. In the marginal areas 8, the pull flange extensions 13 laminated therewith provide an overall pull flange thickness which affords highly desirable leverage for opening the bag top substantially in the manner illustrated in FIG. 1 wherein the laminar pull flanges are shown as partially pulled away from one another for opening the fastener 9, the dash line position indicating the relaxed closed bag orientation to which the resilient material is adapted to return when released before the fastener is fully opened, and when the fastener is in normal, closed condition.

At the inner side of the fastener 9, the material 7 of the sidewalls of the bag is adapted to flex hingedly, as indicated in full line due to internal pressure within the bag, such as imposed by a substantially full bag contents, or trapped air, air purging nitrogen, or the like. Such hinging is enabled at the inner sides of the bases 10 of the fastener strip without imposing opening strains on the closed fastener 9.

In the modified bag 5' of FIG. 2, the general construction of the assembly is substantially the same as in the bag structure 5 of FIG. 1, except that the fastener 9' is of the extruded resilient plastic complementary male arrow profile 15 and grooved female profile 17, and which profiles are shaped and adapted for snap-together, snap-apart separable interlocking cooperation. Each of the fastener profiles 15 and 17 is carried by a body portion 18 which at its inner side is generally aligned with its fastener profile. Extending from the opposite, outer side, the base portion 18 in each instance has a lateral pull flange extension 19 of greater thickness than the sheet material 7'. The pull flange extensions 19 are secured as by means of adhesive 20 in laminar relation respectively to the marginal portions 8' of the bag body material 7' and with the distal edges of the pull flange extensions 19 directed toward the outer edges of the marginal portions 8' of the bag body material 7' and with the edges of the pull flange extensions and the portions 8' in general alignment. Similarly as in respect to the bag 5, the laminar pull flange assemblies are adapted to be pulled apart for releasing the fastener profiles 15 and 17 for opening the bag, and for closing the bag are adapted to be released and the fasteners squeezed together into bag closing relation. At the inner side of the fastener 9', the bag sidewalls comprising the thin bag body material 7' may flex freely hinge-like at the inner edges of the base portions 18 to accommodate internal expansion of the bag without pulling the fastener 9' open.

A new and improved method of making the material for the bags 5 and 5' is demonstrated in FIGS. 3 and 4. Although for illustrative purposes the fastener 9 is depicted in FIGS. 3 and 4, it will be understood that the same method is adapted for producing bag material embodying the fastener 9'.

As shown in FIG. 3, the fastener 9 is adapted to be supplied in closed condition, that is with the fastener profiles 11 interengaged, from a supply roll 21. The bag body sheet material 7 is adapted to be supplied from a roll 22. From the roll 22, the sheet material 7 is guided longitudinally to and medially longitudinally folded by means of a folding device 23 to bring the longitudinal marginal portions 8 into face-to-face relation on either side of the fastener 9 which is suitably guided to run into assembly between the marginal portions 8. Means such as cooperating driving and squeeze rolls 24 suitably driven rotatably, squeeze the assembly together and advance the assembly at the desired speed. Upstream from the convergence of the material 7 and the fastener 9, adhesive 14 is applied as by means of respective nozzles of spray gun devices 27, to each opposite side of the fastener 9, that is to the outside surfaces of the body 10 and the pull flange extensions 13. The thickness of the adhesive layer 14, and the setting characteristics of the adhesive are such that at the speed of travel of the fastener strip, the adhesive will be just tacky enough to provide a firm securing retention of the sheet marginal portions 8 onto the surfaces of 10, 13, with curing to a permanent set rapidly occurring downstream from the advancing and pinch rolls 24.

As shown in FIG. 4, the fastener 9 may be applied to the sheet material 7 in separated form as prefabricated extruded plastic strips 9a and 9b. For this purpose, the sheet material 7 may be supplied from a roll 22 and guided to and folded by the folding device 23 similarly as described in connection with FIG. 3. In this instance, however, the separate, complementary fastener strips 9a and 9b may be supplied from individual supply rolls 28 or separated from a roll of joined fastener. The adhesive applicators 27 are located to apply the adhesive layers to the outer faces of the strips 9a and 9b as they are led from the rolls 28 and just before the strips are brought into laminar relation to the longitudinal marginal portions of the material 7 and the assemblies squeezed together for permanent bonding, by means such as pinch rolls 29 located upstream from the folding device 23. Through this arrangement, the fastener strips 9a and 9b, now attached to the marginal portions 8 are brought into the assembled closed relation upon passing of the bag material assembly through the advancing and pinch rolls 24.

Figure 6:
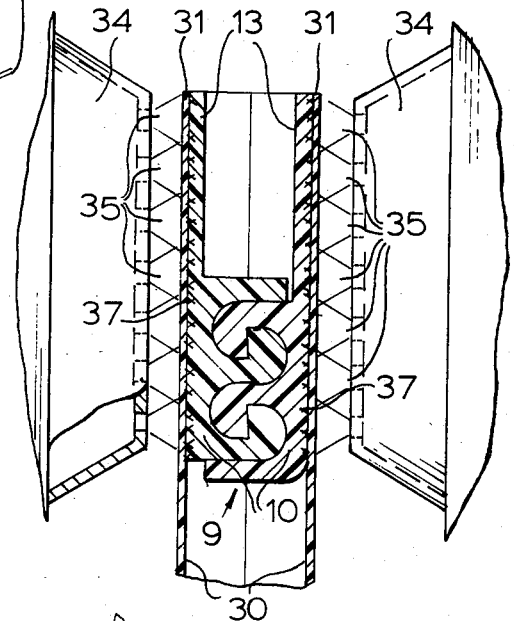
FIG. 6 is a fragmentary enlarged sectional detail view taken substantially along the line VI—VI in FIG. 5.
Figure 7:
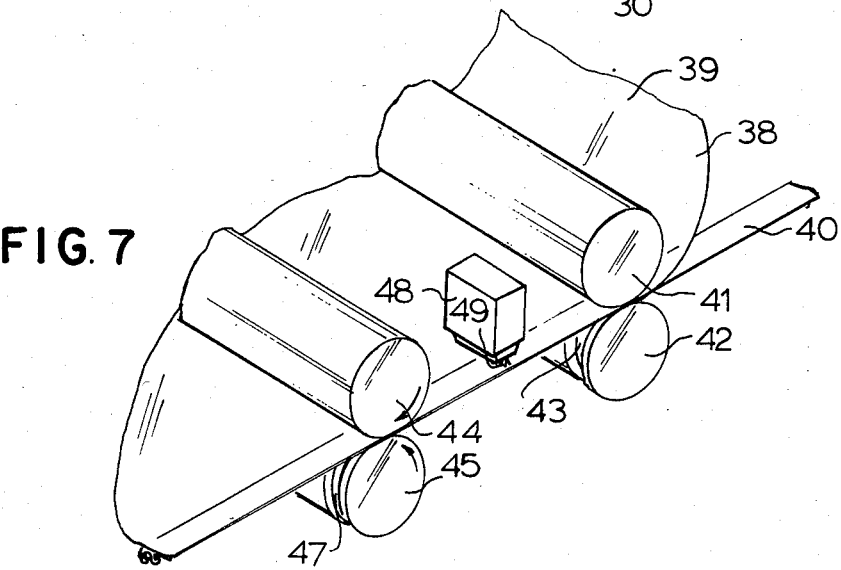
FIG. 7 is a fragmentary perspective view showing still another modification embodying the invention.

Instead of adhesive bonding of the fastener strip to the bag body material, the assembly may, where the fastener strips and the bag body material are compatible, be fused in the manner depicted in FIGS. 5-7, especially adapted for securing preformed fastener strips and bag body material which are no longer in a thermoplastic state when they are joined. By way of example, flexible sidewall sheet material 30 (FIGS. 5 and 6) which provides both sides of the bag and has bag top mouth-opening-defining marginal portions 31 may be folded up from a sheet of the material in strip form, with the marginal portions 31 in engagement with the oppositely facing base and aligned pull flange surfaces of a fastener assembly 9 of similar structure and functioning the same as the fastener assembly 9 in FIG. 1. The flexible bag sidewall sheet material 30 is continuously advanced along an assembly path and the fastener assembly having the complementary fastener strips joined is advanced at the same speed as the material 30 between and into laminar engagement with the marginal portions 31 between pressure rolls 32 which may be driven rotatably in any preferred manner. From the rolls 32, the assembly of bag body material and joined fastener strips passes between another set of rotary cooperating pressure rolls 33 spaced downstream from the rolls 32. Desirably, the rolls 32 and 33 are driven synchronously for advancing the bag material assembly continuously at a desirable speed.

Preferably located between the sets of rolls 32 and 33 are heat source devices 34 which are preferably of a type adapted for supplying heated air. One of the devices 34 is located at one side of the bag making material assembly aligned with the marginal portions 31, and another of the devices 34 is located in alignment with the opposite marginal portion 31 of the bag material assembly. Each of the devices 34 is so related to the associated sheet material marginal portions 31 and the surfaces of the fastener strips in engagement with such marginal portions, that jets 35 of heated air will impinge upon and substantially completely cover the full width of the marginal portions 31, and more particularly, the full width of such marginal portions in engagement with the fastener strip surfaces. The applied heat of the jets 35 is carefully controlled to cause fusion of the marginal portions 31 to the engaged base and pull flange extension surfaces of the fastener strips, as indicated at 37 (FIG. 6), and limited to only a shallow depth so as to avoid warpage and/or profile distortion of the permanently secured assembly. To this end, the intensity and volume of the jets 35 and the fusion heat of the jet air, as well as the size of the incremental area of the assembly progressively impinged as the assembly travels through the fusion zone, are regulated and corelated to control and limit the depth of fusion 37 to a few mils. The impingement pattern of the respective jets 35 is in the form of a narrow band concentrating on a correspondingly narrow area extending lengthwise across the width of the sheet margin laminated to each side of the fastener 9. Since the incremental unit area of fusion heat impingement is thus limited and rapidly progresses along the plastic assembly, there is rapid heat sink relative to each incremental area into the relatively massive bulk of the fastener strips, so that the fusion penetration quickly stops as each narrow incremental area of the plastic assembly progressively moves out of the range of the fusion jets. The fused bond 37, even though shallow, is thorough and uniform throughout the length and width along the fastener 9.

In FIG. 7, a similar heated jet fusion system is depicted but adapted for applying a marginal portion 38 of bag sidewall plastic sheet material 39 to a separate extruded plastic profiled fastener strip 40 before joining such strip with a complementary profiled fastener strip to which another margin of the same sheet 39 or of a separately supplied similar sheet may have been secured in the same fashion. The continuously running preformed fastener strip 40 and the marginal portion 38 of the sheet 39 are joined in the nip of preferably rotatably driven pinch or pressure rolls 41 and 42 wherein the roll 41 engages a sheet 39 and the roll 42 engages the fastener strip 40 and has an annular groove 43 to accommodate the profile of the fastener strip 40 and thereby guide the fastener strip. Spaced downstream from the rolls 41 and 42 is a pair of synchronously running pinch or pressure rolls 44 and 45, the roll 44 engaging the sheet 39 and the roll 45 being grooved as shown in 47 to accommodate the fastener strip 40. A heat source device 48 located intermediate the sets of rolls 41, 42, and 44, 45, continuously directs heated air 49 onto a narrow area across the continuously travelling assembly of sheet material margin 38 and laminarly engaged surface of the fastener strip 40, the heated air being directed under controlled conditions as to heat and velocity so as to attain the results described in connection with the devices 34 and the heated air jets 35.

From the foregoing, it will be apparent that joining of the base portions and lateral pull flange extensions of the fastener strips in laminar relation with the marginal portions of the bag body sheet material may be conveniently effected in respect to the sheet material in one piece and then folded upon itself, but if preferred, the sheet material may be supplied as split or separate continuous sheet strips of preferred width, to the longitudinal edge portions of which the fastener 9, 9' or 40 is attached. Also, although permanent securing of the pull flange extensions and the base portions of the fasteners to the marginal portions of the sheet material by adhesive or heat means is a convenient and effective expedient, other modes of permanent securement may be employed, if preferred, although, generally speaking, the adhesive or heat securement is simpler and requires less critical control expedients during the assembly operation.

It will be understood that variations and modifications may be effected without departing from the spirit and scope of the novel concepts of this invention.

I claim as my invention:

1. A method of making bag material for providing bags with flexible sidewalls and reclosable separable plastic profile bag mouth closure means, comprising:

advancing prefabricated thin and flexible bag sidewall sheet material continuously along an assembly path;

providing prefabricated closure strips having base portions carrying separably interlockable complementary resilient plastic profiles that are generally aligned with said base portions and the base portions provided with lateral pull flange extensions of substantially greater thickness than said sheet material extending away from said profiles from one side of each of said base portions and with the opposite side of each base portion being generally aligned with its profile;

continuously advancing said closure strips along said path and into laminar engagement with bag top mouth-opening-defining longitudinal marginal portions of said sheet material;

continuously joining said base portions and said lateral pull flange extensions in laminar relation assembly with said marginal portions of said sheet material and with the distal edges of said pull flange extensions directed toward the longitudinal edges of said marginal portions;

and while said assembly continues advancing, uninterruptedly permanently securing said pull flange extensions and said base portions of said closure strips in said assembly with said marginal portions of said sheet material by applying heat to the sheet material marginal portions while in laminar engagement with said base portions and said pull flange extensions and thereby causing the heat to penetrate through said marginal portions of the sheet material and causing fusion of said marginal portions to said base portions and to said pull flange extensions, and controlling and limiting the depth of penetration of the applied heat through said marginal portions into said base portions and into said pull flange extensions and thereby avoiding warpage and/or profile distortion of the permanently secured assembly, so that when the bag material is formed up into bags the bags will have pull assemblies of a thickness which is the sum of said sheet material marginal portions and said greater thickness pull flange extensions of said closure strips and will therefore provide pull flanges which are of substantially greater than twice the thickness of said sheet material.

2. A method of making bag material for providing bags with flexible sidewalls and reclosable separable plastic profile bag mouth closure means, comprising:

advancing prefabricated thin and flexible bag sidewall sheet material continuously along an assembly path;

providing prefabricated closure strips having base portions carrying separably interlockable complementary resilient plastic profiles that are generally aligned with said base portions and the base portions provided with lateral pull flange extensions of substantially greater thickness than said sheet material extending away from said profiles from one side of each of said base portions and with the opposite side of each base portion being generally aligned with its profile;

continuously advancing said closure strips along said path and into laminar engagement with bag top mouth-opening-defining longitudinally marginal portions of said material;

continuously joining said base portions and said lateral pull flange extensions in laminar relation assembly with said marginal portions and with the distal edges of said pull flange extensions directed toward the longitudinal edges of said marginal portions;

and while said assembly continues advancing, uninterruptedly permanently securing said pull flange extensions and said base portions in said assembly with said marginal portions;

effecting said permanently securing by applying heat to and through the sheet material marginal portions in laminar engagement with said base portions and said pull flange extensions and thereby causing fusion of said marginal portions to said base portions and to said pull flange extensions; and controlling and limiting the depth of penetration of the heat through said marginal portions into said base portions and into said pull flange extensions and thereby avoiding warpage and/or profile distortion of the permanently secured assembly.

3. A method according to claim 2, comprising supplying said closure strips in preassembled relation with said profiles interlocked and said flange extensions extending in the same direction, and effecting said joining of the base portions and said lateral pull flange extensions with the said marginal portions of the sheet by bringing said marginal portions into assembly with the base portions and with the lateral pull flange extensions of the joined fastener strips.

4. A method according to claim 2, which comprises joining the fastener strips separately to said marginal portions, and then bringing the fastener strips as joined to the respective marginal portions into assembly and interlocking the profiles.

5. A method according to claim 4, comprising supplying the sheet material as a continuous sheet, and folding the sheet longitudinally and bringing said marginal portions into face-to-face relation with said closure strips therebetween.

6. Material for bags with flexible sidewalls having reclosable separable plastic profile bag mouth closure means, comprising:

flexible bag sidewall sheet material having bag top mouth-opening-defining marginal portions;

bag mouth closure means comprising strips having base portions carrying separably interlockable complementary resilient plastic profiles that are generally aligned with said base portions;

lateral pull flange extensions, of substantially greater thickness than said sheet material, extending away from one side of each of said base portions and with the opposite side of each base portion being generally aligned with its profile;

said sheet material being of less than 2 mil thickness, and said pull flange extensions being of at least 3 mil thickness;

and means comprising a heat seal permanently securing said base portions of said closure strips and said pull flange extensions in laminar relation assembly with said marginal portions of said sheet material and with the distal edges of said pull flange extensions directed toward the bag top edges of said marginal portions, so that when the bag material is formed up into bags, the bags will have laminated pull flange assemblies of a thickness which is the sum of said sheet material marginal portions and said greater thickness pull flange extensions of said closure strips and will therefore provide pull flanges which are of substantially greater than twice the thickness of said sheet material.

7. Bag material according to claim 6, wherein said profiles comprise a plurality of separably interlocking generally hook-shape ribs and intervening grooves.

8. Bag material according to claim 6, wherein said profiles comprise a generally arrow-shaped profile on one of said strips and a complementary groove shaped profile on the other of said strips adapted for receiving and interlockably cooperating with said arrow-shaped profile.

9. Bag material according to claim 6, wherein said heat seal comprises heat-effected fusion of the sheet material marginal portions in permanent attachment to said base portions and said pull flange extensions, said fusion being limited to depth of penetration into said base portions and said pull flange extensions so that the assembly is substantially free from warpage and/or profile distortion of the permanently secured assembly.

* * * * *